US012342125B2

(12) United States Patent
Chang et al.

(10) Patent No.: US 12,342,125 B2
(45) **Date of Patent: *Jun. 24, 2025**

(54) ELECTRONIC DEVICE AND SPEAKER MODULE

(71) Applicant: Acer Incorporated, New Taipei (TW)

(72) Inventors: Jia-Ren Chang, New Taipei (TW); Ruey-Ching Shyu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/735,816

(22) Filed: Jun. 6, 2024

(65) Prior Publication Data

US 2024/0323588 A1 Sep. 26, 2024

Related U.S. Application Data

(63) Continuation of application No. 17/527,298, filed on Nov. 16, 2021, now Pat. No. 12,035,099.

(30) Foreign Application Priority Data

Jul. 9, 2021 (TW) ................................ 110125277

(51) Int. Cl.
*H04R 1/28* (2006.01)
*H04R 1/02* (2006.01)

(52) U.S. Cl.
CPC ........... *H04R 1/2803* (2013.01); *H04R 1/025* (2013.01); *H04R 1/288* (2013.01); *H04R 2400/11* (2013.01)

(58) Field of Classification Search
CPC ...... H04R 1/2803; H04R 1/025; H04R 1/288; H04R 2400/11; H04R 1/2873; H04R 1/227; H04R 2209/026; H04R 2499/15
(Continued)

(56) References Cited

U.S. PATENT DOCUMENTS 7,346,315 B2 3/2008 Zurek
2021/0368272 A1 11/2021 Wang
(Continued)

FOREIGN PATENT DOCUMENTS

CN 106686506 A 5/2017
CN 106792394 A 5/2017

OTHER PUBLICATIONS

Chinese language office action dated Aug. 8, 2022, issued in application No. TW 110125277.

*Primary Examiner* — Sean H Nguyen

(74) *Attorney, Agent, or Firm* — McClure, Qualey & Rodack, LLP

(57) ABSTRACT

A speaker module includes a casing and a speaker unit. The casing has a sound outlet. The speaker unit is arranged in the casing, the speaker unit and the sound outlet are arranged along a transverse axis, and the speaker unit includes a bearing base, a first speaker assembly, and a second speaker assembly. The first and second speaker assemblies are disposed on the bearing base. The first speaker assembly and the second speaker assembly are symmetrical relative to the bearing base. A first sound cavity is formed between the casing and the first speaker assembly, a second sound cavity is formed between the casing and the second speaker assembly, the first sound cavity and the second sound cavity are communicated with the sound outlet, and the first sound cavity and the second sound cavity have the same size and are symmetrical relative to the bearing base.

20 Claims, 10 Drawing Sheets

(58) Field of Classification Search
USPC .......................................................... 381/345
See application file for complete search history.

(56) References Cited

U.S. PATENT DOCUMENTS

| | | | |
|---|---|---|---|
| 2023/0254634 | A1 | 8/2023 | Li |
| 2023/0319481 | A1 | 10/2023 | Wang |

ELECTRONIC DEVICE AND SPEAKER MODULE

CROSS REFERENCE TO RELATED APPLICATIONS

This application is a Continuation of application Ser. No. 17/527,298, filed on Nov. 16, 2021 (now U.S. Pat. No. 12,035,099), which claims the benefit of Taiwan Patent Application No. 110125277, filed on Jul. 9, 2021, the entirety of which is incorporated by reference herein.

BACKGROUND OF THE DISCLOSURE

Field of the Disclosure

The present disclosure relates to a speaker module, and particularly to a speaker module capable of eliminating self-vibration.

Description of the Related Art

As technology has developed, many electronic devices (such as notebook computers) are now very popular products. The notebook computers are the most popular among the consumer products today. Users can run various applications on the notebook computer to achieve various desired purposes, such as watching videos, playing video games, browsing the web or reading e-books and so on.

Generally, the electronic device such as notebook computer is equipped with at least one speaker module configured to emit sounds (such as music). However, the existing speaker module generates unnecessary vibration when it emits sound, and the vibration may let the speaker module collide with the casing of the notebook computer to cause noise, thereby affecting the sound effect of the speaker module.

Therefore, how to design a speaker module that can avoid unnecessary vibration is a topic that needs to be discussed and solved.

BRIEF SUMMARY OF THE DISCLOSURE

Accordingly, one objective of the present disclosure is to provide a speaker module to solve the above problems.

According to some embodiments of the disclosure, a speaker module is provided and includes a casing and a speaker unit. The casing has a sound outlet. The speaker unit is arranged in the casing, the speaker unit and the sound outlet are arranged along a transverse axis, and the speaker unit includes a bearing base, a first speaker assembly, and a second speaker assembly. The first speaker assembly and the second speaker assembly are disposed on the bearing base. The first speaker assembly, the bearing base and the second speaker assembly are arranged in sequence along a longitudinal axis, and the first speaker assembly and the second speaker assembly are symmetrical relative to the bearing base. A first sound cavity is formed between the casing and the first speaker assembly, a second sound cavity is formed between the casing and the second speaker assembly, the first sound cavity and the second sound cavity are communicated with the sound outlet, and the first sound cavity and the second sound cavity have the same size and are symmetrical relative to the bearing base.

According to some embodiments, the casing includes an outer frame, a first clamping member, a second clamping member and a third clamping member, the first clamping member, the second clamping member and the third clamping member are fixed in the outer frame, the first clamping member and the second clamping member clamp a first side of the speaker unit, the third clamping member clamps a second side of the speaker unit, and the first side is opposite the second side.

According to some embodiments, the speaker module further includes a first sound insulation element and a second sound insulation element. The first sound insulation element is, disposed between the first clamping member and the outer frame. The second sound insulation element is disposed between the second clamping member and the outer frame. When viewed along a long axis of the speaker unit, the first sound insulation element and the second sound insulation element are symmetrical to the transverse axis, and the first clamping member and the second clamping member are symmetrical to the transverse axis.

According to some embodiments, the outer frame, the first sound insulation element, the first clamping member, the first speaker assembly and the third clamping member form the first sound cavity, and the outer frame, the second sound insulation element, the second clamping member, the second speaker assembly and the third clamping member form the second sound cavity.

According to some embodiments, the outer frame has a first side wall, a second side wall, a third side wall and a fourth side wall, the first side wall is connected to the third side wall, and the second side wall is connected to the fourth side wall, wherein a distance between a first diaphragm of the first speaker assembly and the first side wall in the longitudinal axis is equal to a distance between a second diaphragm of the second speaker assembly and the second side wall in the longitudinal axis. A distance between the first sound insulation element and the third side wall in the transverse axis is equal to a distance between the second sound insulation element and the fourth side wall in the transverse axis, a distance between the third clamping member and the third side wall in the transverse axis is equal to a distance between the third clamping member and the fourth side wall in the transverse axis, and a length of the third side wall in the longitudinal axis is equal to a length of the fourth side wall in the longitudinal axis.

According to some embodiments, the first clamping member, the second clamping member and the outer frame form a semi-enclosed third sound cavity, the third sound cavity is communicated with a first vent hole of the speaker unit, the third clamping member and the speaker unit form a semi-enclosed fourth sound cavity, and the fourth sound cavity is communicated with a second vent hole of the speaker unit.

According to some embodiments, the speaker module further includes at least one buffer element disposed between the first clamping member and the speaker unit, between the second clamping member and the speaker unit, and/or between the third clamping member and the speaker unit.

According to some embodiments of the disclosure, a speaker module includes a casing and a speaker unit. The casing has a first sound exiting portion and a second sound exiting portion. The speaker unit is disposed in the casing, and the speaker unit includes a holding base, a first speaker assembly and a second speaker assembly. The first speaker assembly is disposed on the holding base. The second speaker assembly is disposed on the holding base. The first sound exiting portion, the first speaker assembly, the holding base, the second speaker assembly and the second sound exiting portion are arranged in order along a longitudinal axis, and the first speaker assembly and the second speaker assembly are symmetrical to the holding base. A first sound cavity is formed between the casing and the first speaker assembly, a second sound cavity is formed between the casing and the second speaker assembly, the first sound cavity is communicated with the first sound exiting portion, the second sound cavity is communicated with the second sound exiting portion, and the first sound cavity and the second sound cavity have the same size and are symmetrical to the holding base.

According to some embodiments, the casing includes an outer frame, a first clamping member, a second clamping member and a third clamping member, the first clamping member, the second clamping member and the third clamping member are fixed in the outer frame, the first clamping member and the second clamping member clamp a first side of the speaker unit, the third clamping member clamps a second side of the speaker unit, and the first side is opposite the second side.

According to some embodiments, the speaker module further includes a first sound insulation element and a second sound insulation element. The first sound insulation element is disposed between the first clamping member and the outer frame. The second sound insulation element is disposed between the second clamping member and the outer frame. When viewed along a long axis of the speaker unit, the first sound insulation element and the second sound insulation element are symmetrical to a transverse axis of the speaker unit, and the first clamping member and the second clamping member are symmetrical to the transverse axis.

According to some embodiments, the speaker module further includes a third sound insulation element and a fourth sound insulation element disposed between the third clamping member and the outer frame. When viewed along the long axis, the third sound insulation element and the fourth sound insulation element are symmetrical to the transverse axis.

According to some embodiments, the first sound cavity is formed by the outer frame, the first sound insulation element, the first clamping member, the first speaker assembly, the third sound insulation element and the third clamping member, and the second sound cavity is formed by the outer frame, the second sound insulation element, the second clamping member, the second speaker assembly, the fourth sound insulation element and the third clamping member.

According to some embodiments, the outer frame has a first side wall and a second side wall, and the first sound exiting portion and the second sound exiting portion are respectively formed on the first side wall and the second side wall. A distance between a first diaphragm of the first speaker assembly and the first side wall in the longitudinal axis is equal to a distance between a second diaphragm of the second speaker assembly and the second side wall in the longitudinal axis. A distance between the first sound insulation element and the third sound insulation element in the transverse axis is equal to a distance between the second sound insulation element and the fourth sound insulation element in the transverse axis.

According to some embodiments, the first sound exiting portion has a plurality of first sound outlets, the second sound exiting portion has a plurality of second sound outlets, and these first sound outlets and these second sound outlets are symmetrical to the transverse axis.

According to some embodiments, total area of the first sound outlets is at least 50% of area of the first diaphragm.

According to some embodiments, the first clamping member, the second clamping member and the outer frame form a semi-enclosed third sound cavity, the third sound cavity is communicated with a first vent hole of the speaker unit, the third clamping member and the speaker unit form a semi-enclosed fourth sound cavity, and the fourth sound cavity is communicated with a second vent hole of the speaker unit.

According to some embodiments, the speaker module further includes at least one buffer element disposed between the first clamping member and the speaker unit, between the second clamping member and the speaker unit, and/or between the third clamping member and the speaker unit.

According to some embodiments of the disclosure, an electronic device includes a housing and a speaker module. The housing has a lower part. The speaker module includes a casing and a speaker unit. The casing has a first sound exiting portion and a second sound exiting portion. The speaker unit is disposed in the casing, and the speaker unit includes a holding base, a first speaker assembly and a second speaker assembly. The first speaker assembly is disposed on the holding base. The second speaker assembly is disposed on the holding base. The first sound exiting portion, the first speaker assembly, the holding base, the second speaker assembly and the second sound exiting portion are arranged in order along a longitudinal axis, and the first speaker assembly and the second speaker assembly are symmetrical to the holding base. A first sound cavity is formed between the casing and the first speaker assembly, a second sound cavity is formed between the casing and the second speaker assembly, the first sound cavity is communicated with the first sound exiting portion, the second sound cavity is communicated with the second sound exiting portion, and the first sound cavity and the second sound cavity have the same size and are symmetrical to the holding base. The electronic device is disposed on a desktop through a supporting member, there is a first gap between the lower part and the desktop, and there is a second gap between a second diaphragm of the second speaker assembly and the lower part, wherein the first gap is at least one third of the second gap.

The present disclosure provides a speaker module, including a casing and a speaker unit. The speaker unit includes a holding base and a pair of speaker assemblies. The first speaker assembly and the second speaker assembly are symmetrical to the holding base. The casing and the first speaker assembly form a first sound cavity, and the casing and the second speaker assembly form a second sound cavity. The first sound cavity and the second sound cavity have the same size and are symmetrical to the holding base, so that when the speaker unit emits sound, the pressure in the first sound cavity is the same as the pressure in the second sound cavity. Therefore, the speaker unit remains stable without any vibration (such as vibration in the Z-axis).

In addition, because the first speaker assembly and the second speaker assembly are symmetrical to the holding base, when the speaker unit receives a current, the first electromagnetic driving force and the second electromagnetic driving force for respectively driving the first diaphragm and the second diaphragm to vibrate have the same magnitude but in opposite directions, so that the holding base is not affected by the above-mentioned electromagnetic driving forces. That is, the holding base is not moved along the Z-axis when the speaker unit emits a sound.

Based on the design of this disclosure, when the speaker module receives a current signal and emits sound, the speaker module has no displacement in the Z-axis. Therefore, the speaker module installed on any electronic device (such as a tablet computer or a smartphone) does not cause vibration noise and affect the sound output of the speaker module.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
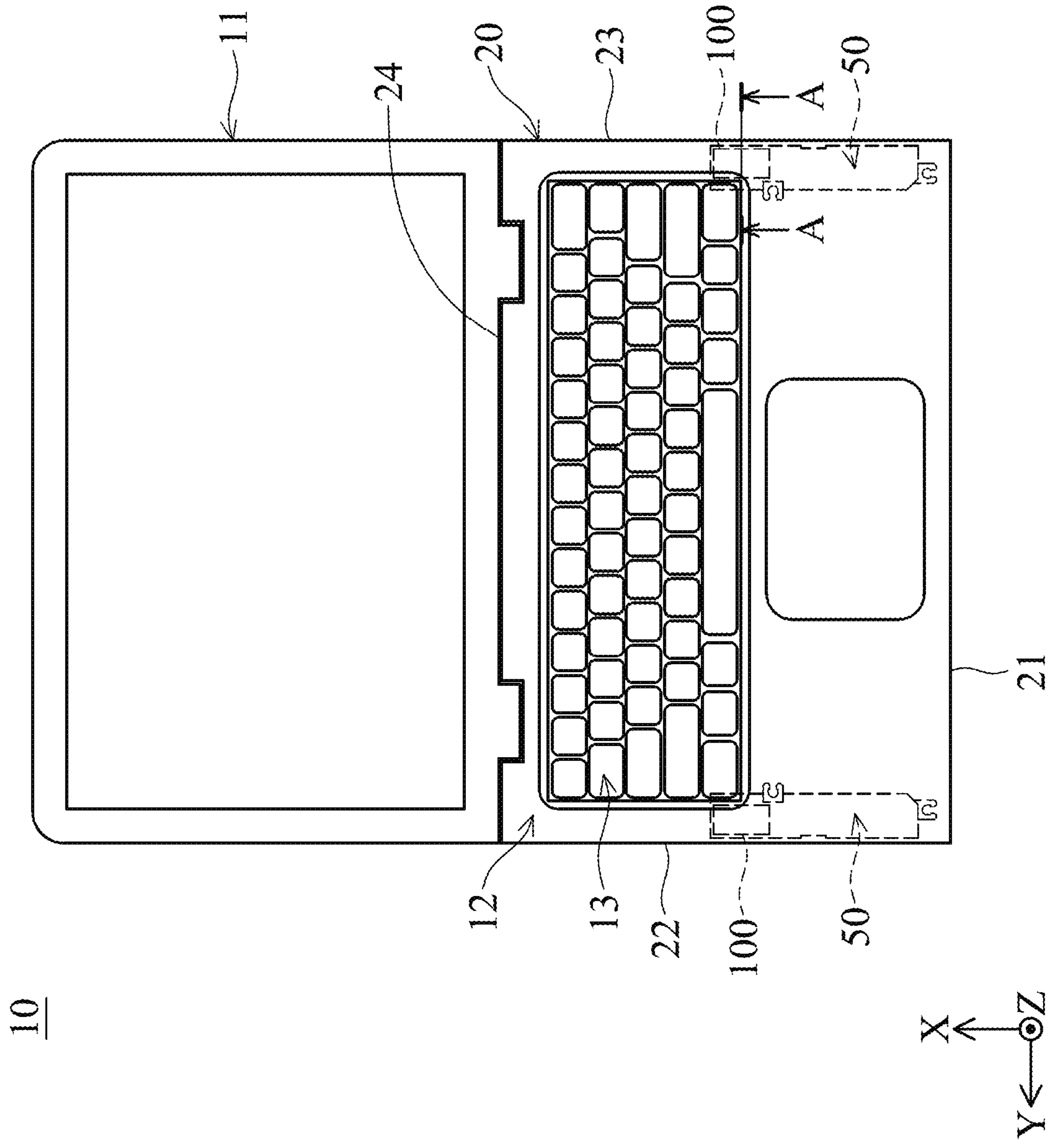
FIG. 1 is a diagram of an electronic device 10 according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as “up”, “down”, “left”, “right”, “front” or “rear”, are reference directions for accompanying drawings. Therefore, using the directional terms is for description instead of limiting the disclosure.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Please refer to FIG. 1, which is a diagram of an electronic device 10 according to an embodiment of the present disclosure. The electronic device 10 is, for example, a notebook computer, which has a display module 11 and a host module 12. The host module 12 is connected to the display module 11, and the host module 12 may include a keyboard 13, a housing 20, and two speaker modules 50. The speaker modules 50 can be installed on at least one of a front side 21, a left side 22, a right side 23, and a rear side 24 of the housing 20.

In this embodiment, as shown in FIG. 1, two speaker modules 50 are respectively disposed on the left side 22 and the right side 23, but it is not limited thereto. In other embodiments, they can be disposed on other sides according to the required sound effects. Furthermore, the speaker module 50 includes a speaker unit 100, which is configured to convert current signals into sound signals. The specific structural features of the speaker unit 100 are described in detail in the following paragraphs.

Figure 2:
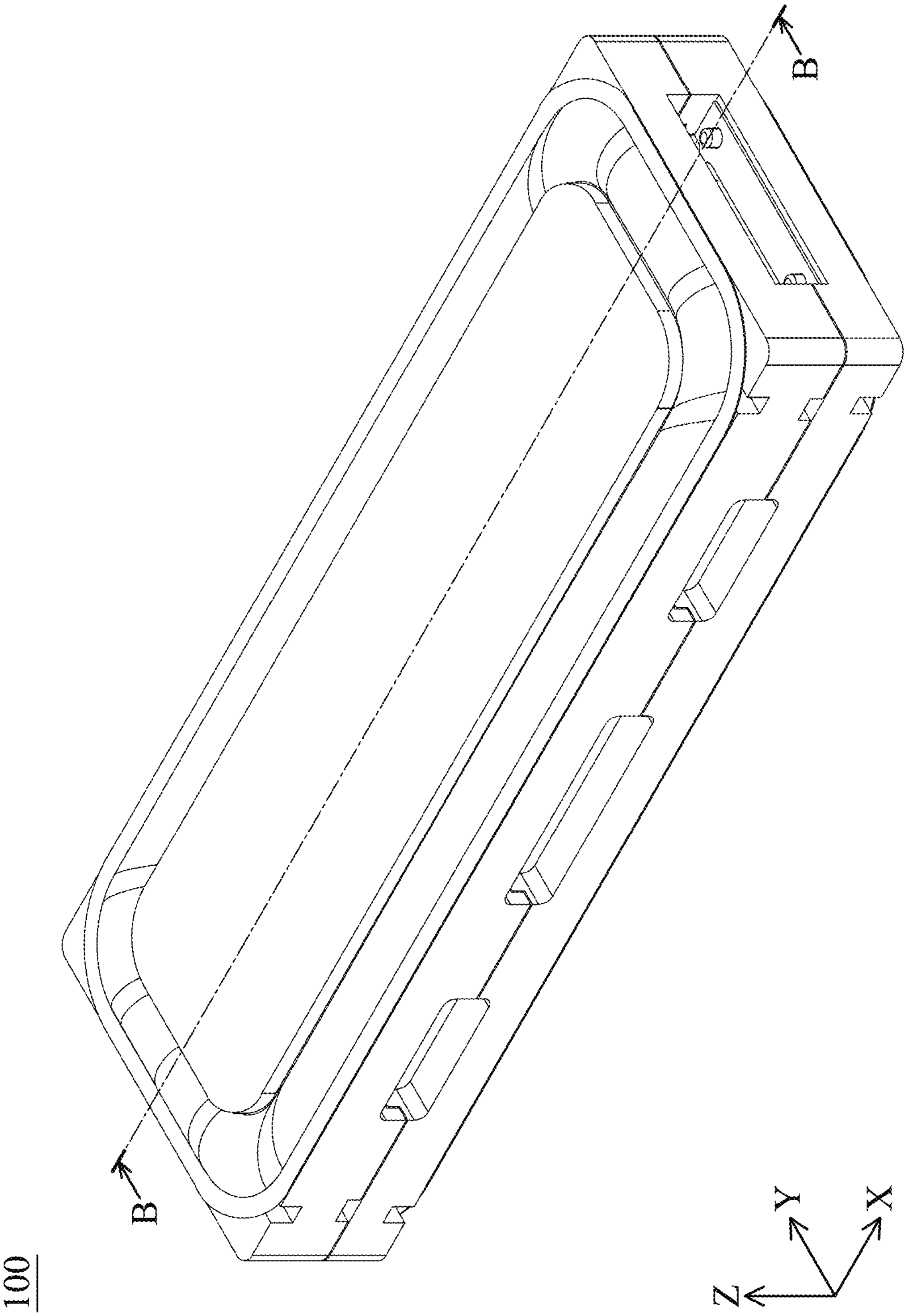
FIG. 2 is a perspective view of the speaker unit 100 according to an embodiment of the present disclosure.
Figure 3:
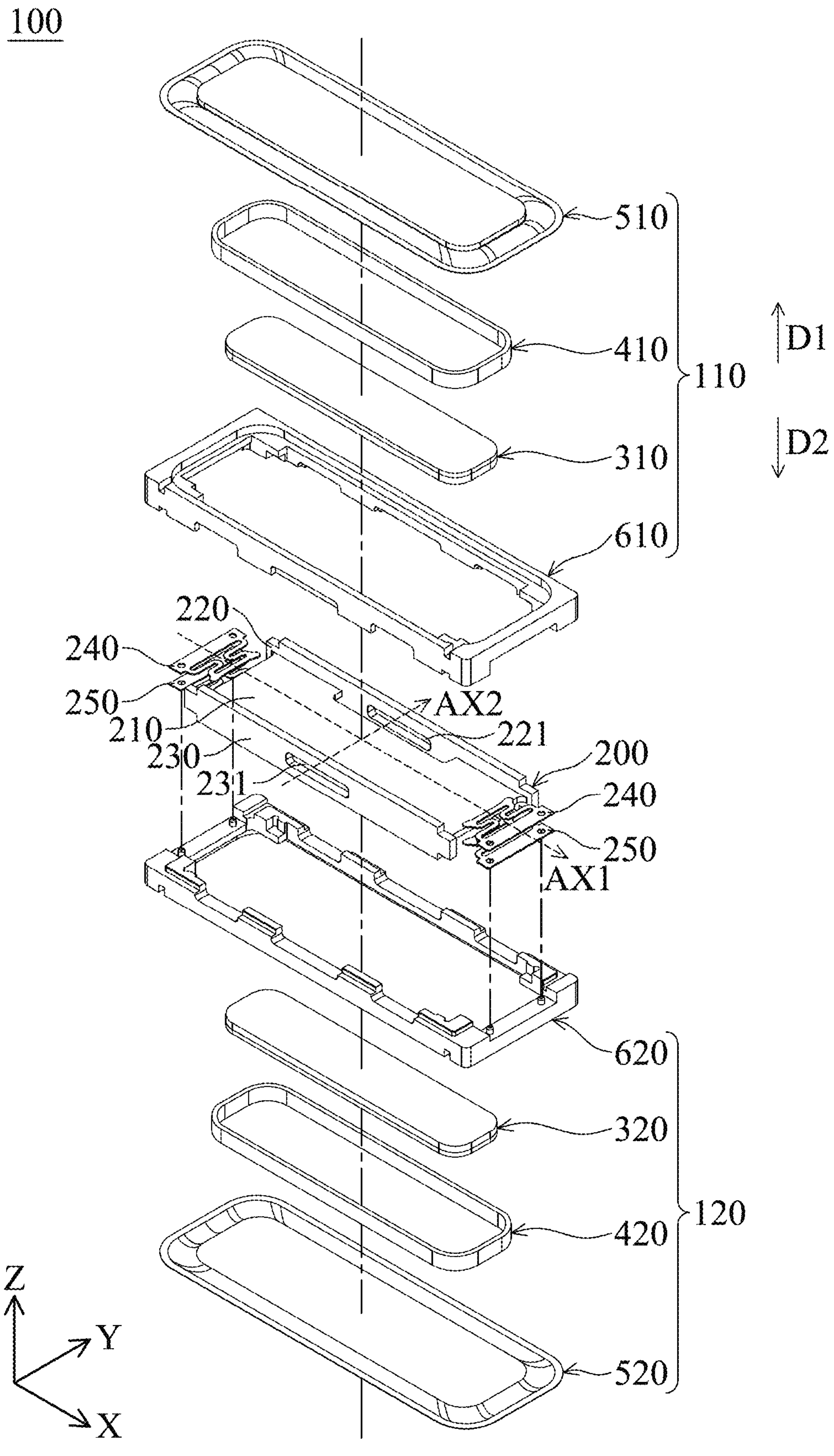
FIG. 3 is an exploded diagram of the speaker unit 100 according to an embodiment of the present disclosure.
Figure 4:
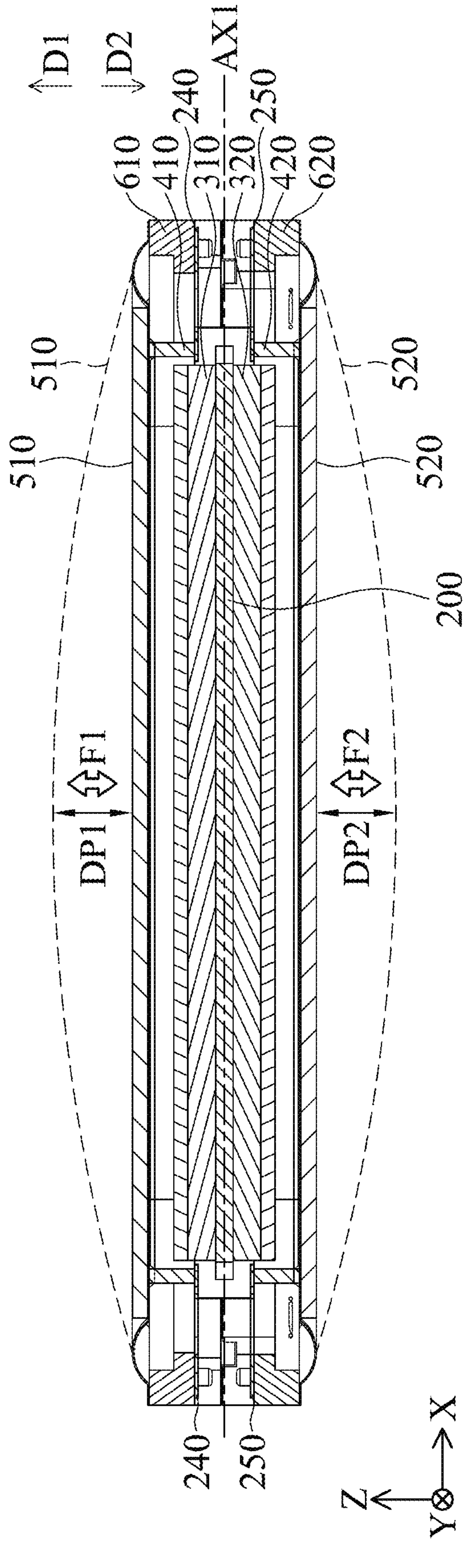
FIG. 4 is a schematic cross-sectional view of the speaker unit 100 along line B-B according to an embodiment of the present disclosure.

Please refer to FIG. 2 to FIG. 4. FIG. 2 is a perspective view of the speaker unit 100 according to an embodiment of the present disclosure, FIG. 3 is an exploded diagram of the speaker unit 100 according to an embodiment of the present disclosure, and FIG. 4 is a schematic cross-sectional view of the speaker unit 100 along line B-B according to an embodiment of the present disclosure. In this embodiment, the speaker unit 100 may include a holding base 200, a first speaker assembly 110, and a second speaker assembly 120.

The second speaker assembly 120, the holding base 200, and the first speaker assembly 110 are sequentially arranged in a first direction D1. Specifically, as shown in FIG. 3 and FIG. 4, the first speaker assembly 110 and the second speaker assembly 120 are symmetrically arranged on the upper and lower sides of the holding base 200.

The first speaker assembly 110 includes a first magnet 310, a first coil 410, and a first diaphragm 510. The first magnet 310 is fixedly disposed on the holding base 200, the first coil 410 corresponds to the first magnet 310, and the first diaphragm 510 is fixedly connected to one side of the first coil 410.

Similarly, the second speaker assembly 120 includes a second magnet 320, a second coil 420, and a second diaphragm 520. The second magnet 320 is fixedly disposed on the holding base 200, the second coil 420 corresponds to the second magnet 320, and the second diaphragm 520 is fixedly connected to one side of the second coil 420.

Furthermore, the speaker unit 100 may further include a first frame 610 and a second frame 620, the first frame 610 may be included in the first speaker assembly 110, and the second frame 620 may be included in the second speaker assembly 120. The first frame 610 is fixed to the second frame 620, for example, by dispensing glue, and they can hold the holding base 200 together. The first frame 610, the second frame 620, and the holding base 200 can be made of plastic materials. Furthermore, the first frame 610 and the second frame 620 can hold the first diaphragm 510 and the second diaphragm 520, respectively.

It should be noted that the first speaker assembly 110 and the second speaker assembly 120 have the same size, material, and parameters. Specifically, the first magnet 310 and the second magnet 320 are the same element and have the same magnetic permeability, the first coil 410 and the second coil 420 have the same number of turns and the same length of wire, and the first diaphragm 510 and the second diaphragm 520 are the same element and made of the same material.

Therefore, as shown in FIG. 4, when the first coil 410 and the second coil 420 receive a current (for example, an alternating current), the first magnet 310 and the first coil 410 will induce a first electromagnetic driving force F1 to cause the first coil 410 to drive the first diaphragm 510 to move, and the second magnet 320 and the second coil 420 induce a second electromagnetic driving force F2 to cause the second coil 420 to drive the second diaphragm 520 to move at the same time. In addition, the displacement of the first diaphragm 510 and the displacement of the second diaphragm 520 have the same magnitude but in opposite directions.

For example, the waveform of the current is a sine wave, and when the phase of the current is 0 to 180 degrees, the first diaphragm 510 can have a first displacement DP1 in the first direction D1, and the second diaphragm 520 can have a second displacement DP2 in a second direction D2. Conversely, when the phase of the current is 180 to 360 degrees, the first diaphragm 510 can have a first displacement DP1 in the second direction D2, and the second diaphragm 520 can have a second displacement DP2 in the first direction D1. In this embodiment, the first electromagnetic driving force F1 and the second electromagnetic driving force F2 have the same magnitude, so that the first displacement DP1 and the second displacement DP2 have the same magnitude but opposite directions.

In addition, it should be noted that the first coil 410 is connected to the second coil 420 in parallel, so that the phases of the currents received by the first coil 410 and the second coil 420 at the same time point are the same.

Based on the above design, when the speaker unit 100 receives the current, the first electromagnetic driving force F1 and the second electromagnetic driving force F2 for respectively driving the first diaphragm 510 and the second diaphragm 520 to vibrate have the same magnitude but in opposite directions, so that the holding base 200 is not affected by the above-mentioned electromagnetic driving forces. That is, the holding base 200 is not moved along the Z-axis when the speaker unit 100 emits a sound.

Figure 5:
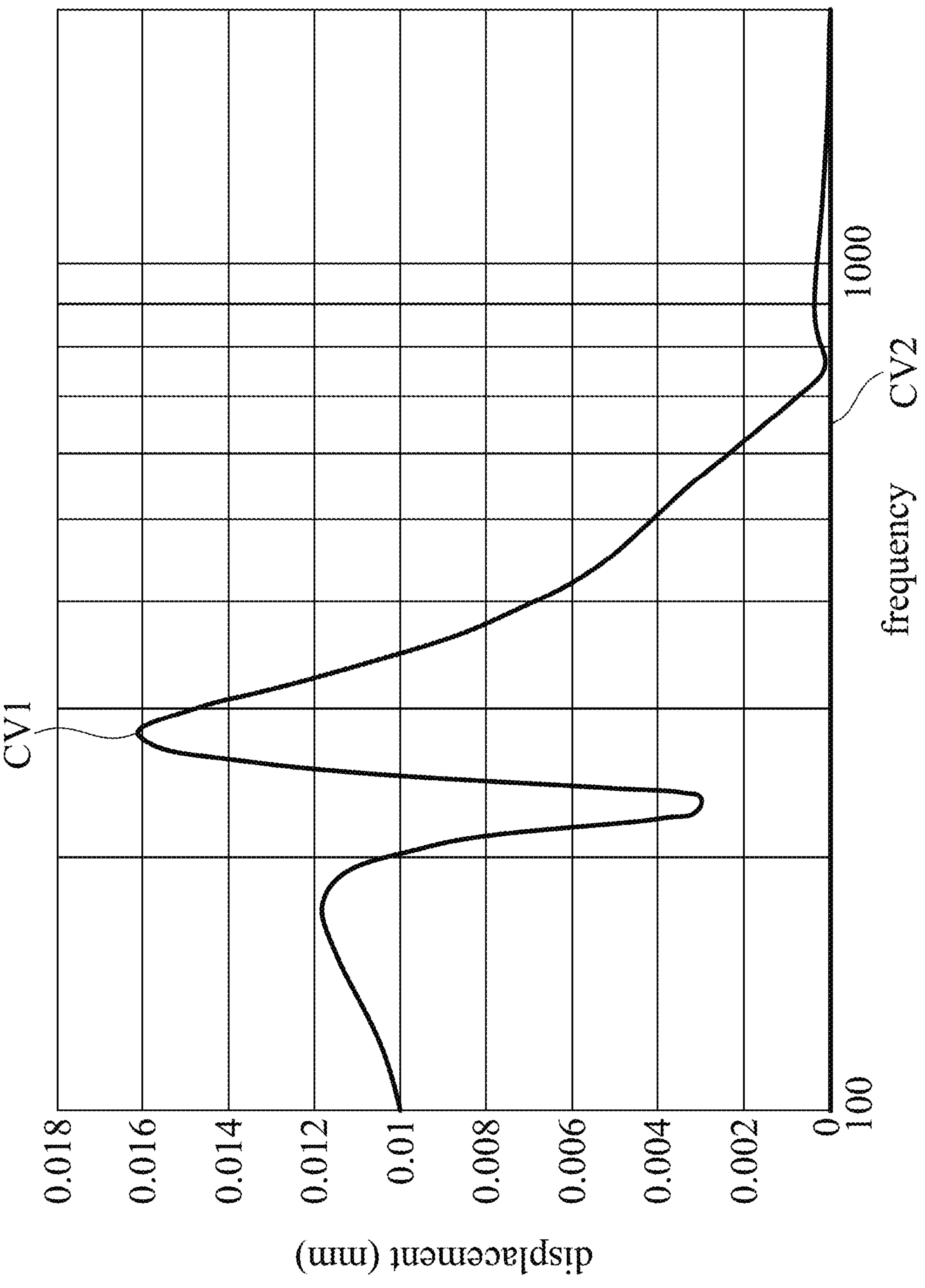
FIG. 5 shows the relationship between frequency and displacement of the speaker unit 100 and a conventional speaker module according to an embodiment of the present disclosure.

Next, please refer to FIG. 5, which shows the relationship between frequency and displacement of the speaker unit 100 and a conventional speaker module according to an embodiment of the present disclosure. As shown in FIG. 5, the curve line CV1 represents the displacement in the Z-axis when the conventional speaker module emits sounds in different frequencies, and the line CV2 represents the displacement of the speaker unit 100 of the present disclosure in the Z-axis when emitting sounds in different frequencies.

As shown in FIG. 5, the displacement of the conventional speaker module in the Z-axis in multiple frequencies is greater than 0. That is, the conventional speaker module generates vibration when it emits a sound. The displacement of the speaker unit 100 of the present disclosure in different frequencies is zero. Therefore, when the speaker unit 100 of the present disclosure emits sounds, it does not generate unnecessary vibration as the conventional speaker module.

Figure 6:
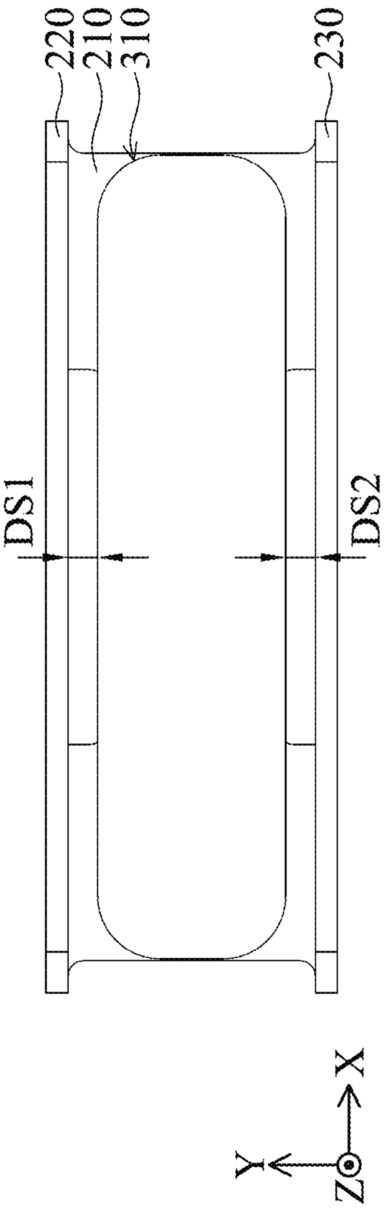
FIG. 6 is a top view of a partial structure of the speaker unit 100 according to an embodiment of the present disclosure.
Figure 7:
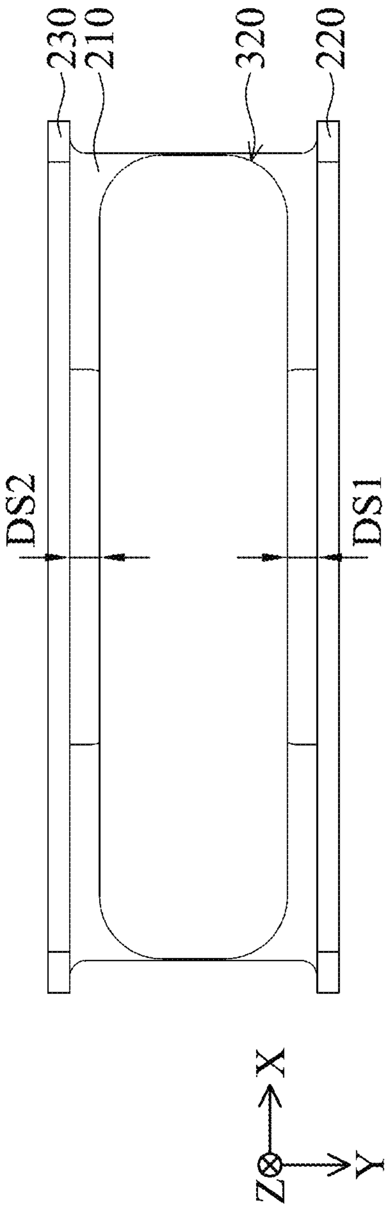
FIG. 7 is a bottom view of a partial structure of the speaker unit 100 according to an embodiment of the present disclosure.

Next, please refer to FIG. 3, FIG. 6 and FIG. 7 together. FIG. 6 is a top view of a partial structure of the speaker unit 100 according to an embodiment of the present disclosure, and FIG. 7 is a bottom view of a partial structure of the speaker unit 100 according to an embodiment of the present disclosure. The holding base 200 may have a base plate 210, a side wall 220 and a side wall 230, and the first magnet 310 and the second magnet 320 are fixed on opposite sides of the base plate 210.

Furthermore, as shown in FIG. 6, when viewed in the first direction D1 (the Z-axis), the distance DS1 between the side wall 220 and the first magnet 310 in the Y-axis is equal to the distance DS2 between the side wall 230 and the first magnet 310 in the Y-axis. Similarly, as shown in FIG. 7, the distance DS2 between the side wall 230 and the second magnet 320 in the Y-axis is equal to the distance DS1 between the side wall 220 and the second magnet 320 in the Y-axis.

Based on the above structural design, the first magnet 310 and the second magnet 320 have the same magnetic path, thereby ensuring that the first speaker assembly 110 and the second speaker assembly 120 generate the electromagnetic driving forces with the same magnitude.

Figure 8:
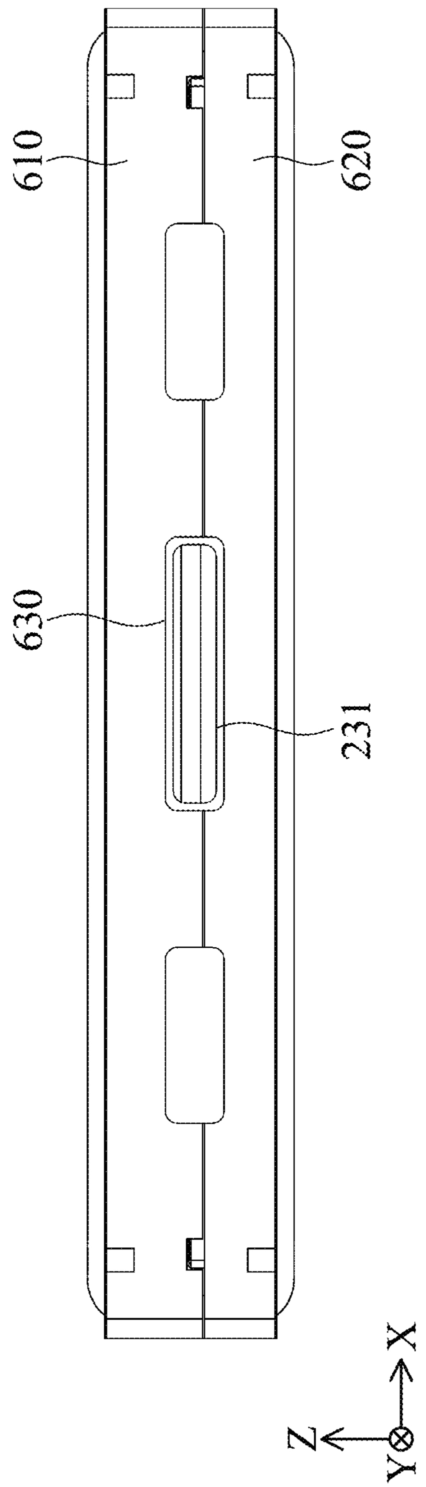
FIG. 8 is a front view of the speaker unit 100 according to an embodiment of the present disclosure.

Please refer to FIG. 2, FIG. 3, and FIG. 8. FIG. 8 is a front view of the speaker unit 100 according to an embodiment of the present disclosure. In this embodiment, the holding base 200 may define a first axis AX1 and a second axis AX2, a vent hole 221 may be formed on the side wall 220, a vent hole 231 may be formed on the side wall 230, and the vent hole 221 and the vent hole 231 are arranged along the second axis AX2 and are symmetrical to the first axis AX1 and the second axis AX2.

In addition, the first frame 610 and the second frame 620 may cooperatively form a plurality of through holes 630, corresponding to the aforementioned vent hole 221 and vent hole 231. For example, the first frame 610 and the second frame 620 cooperatively form six through holes 630, which are evenly arranged on two opposite sides of the speaker unit 100. Furthermore, as shown in FIG. 8, when viewed along the second axis AX2 (the Y-axis), the through hole 630 in the middle overlaps the vent hole 231.

Based on the design of the aforementioned vent holes and through holes symmetrical to the first axis AX1, it can be ensured that when the first diaphragm 510 and the second diaphragm 520 vibrate, air can be uniformly discharged from the speaker unit 100 through the aforementioned vent holes and through holes so as to prevent the speaker unit 100 from vibrating in the Z-axis.

Furthermore, in this embodiment, as shown in FIG. 3 and FIG. 4, the holding base 200 may further include two first cantilevers 240 and two second cantilevers 250. The second cantilevers 240 are connected to the first coil 410 and the first frame 610, and the two second cantilevers 250 are connected to the second coil 420 and the second frame 620. Furthermore, the first coil 410 is electrically connected to the two first cantilevers 240, and the second coil 420 is electrically connected to the two second cantilevers 250.

In this embodiment, the two first cantilevers 240 and the second cantilevers 250 are symmetric related to the first axis AX1, the two first cantilevers 240 are symmetric relative to the second axis AX2, and the second cantilevers 250 are symmetric related to the second axis AX2. Furthermore, in some embodiments, the first cantilevers 240 and the second cantilevers 250 can be connected to an external casing (as shown in FIG. 10), so that the speaker unit 100 can be suspended in the housing.

Figure 9:
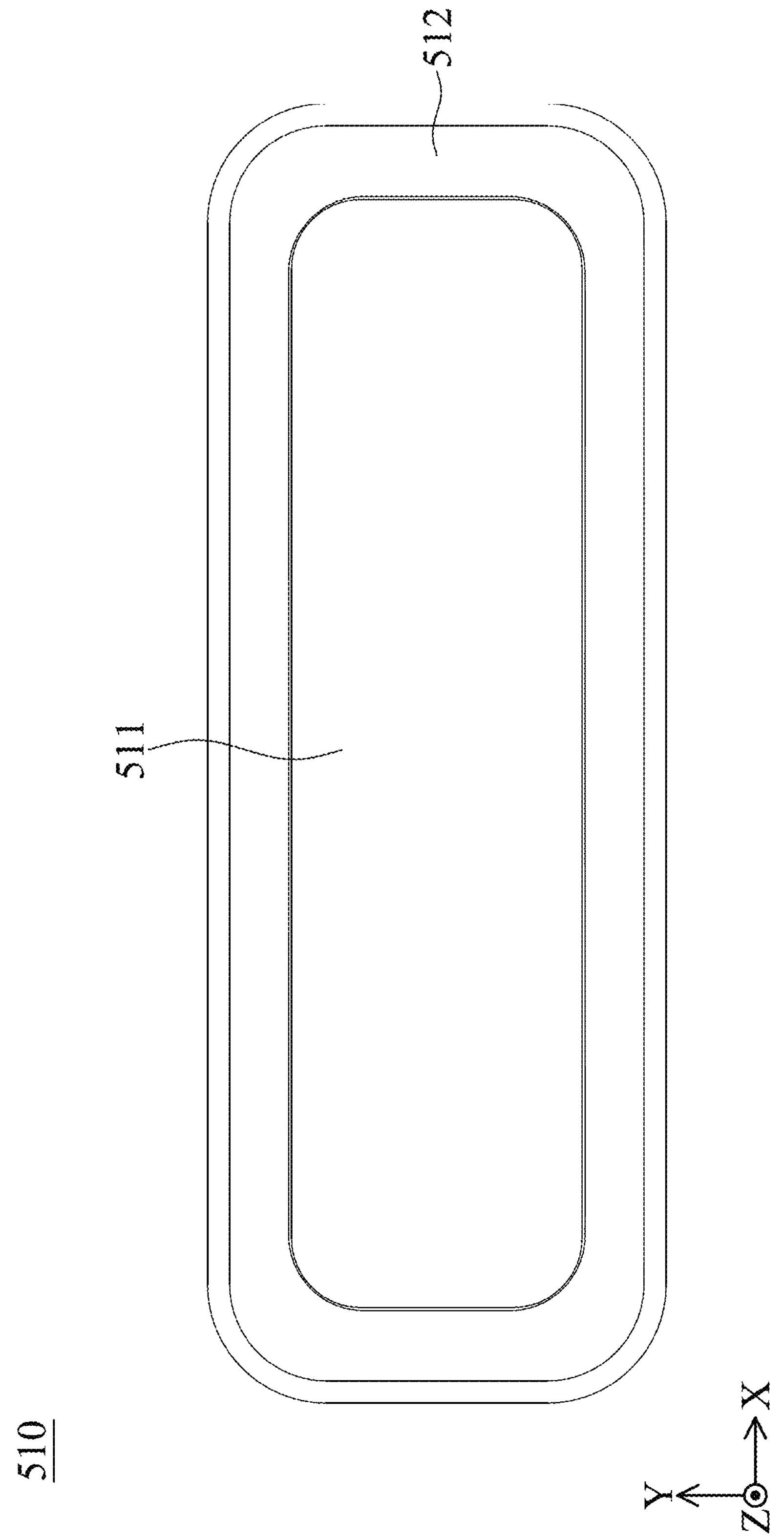
FIG. 9 is a top view of the first diaphragm 510 according to an embodiment of the present disclosure.

Please refer to FIG. 9, which is a top view of the first diaphragm 510 according to an embodiment of the present disclosure. In this embodiment, the first diaphragm 510 has an inner side portion 511 and an outer side portion 512. The outer side portion 512 surrounds the inner side portion 511, and the hardness of the inner side portion 511 is greater than the hardness of the outer side portion 512. For example, the inner side portion 511 may be made of paper, carbon fiber or metal materials, and the outer side portion 512 may be made of foam or plastic materials. As for the second diaphragm 520, whose structure and material are the same as those of the first diaphragm 510, so they are omitted herein.

In the present disclosure, the shape of the first diaphragm 510 (and the second diaphragm 520) is not limited to the rectangle in the foregoing embodiments. For example, in other embodiments, the first diaphragm 510 may have an oval structure or a circular structure. That is, the first diaphragm 510 can be used for different shapes of the speaker module.

Figure 10:
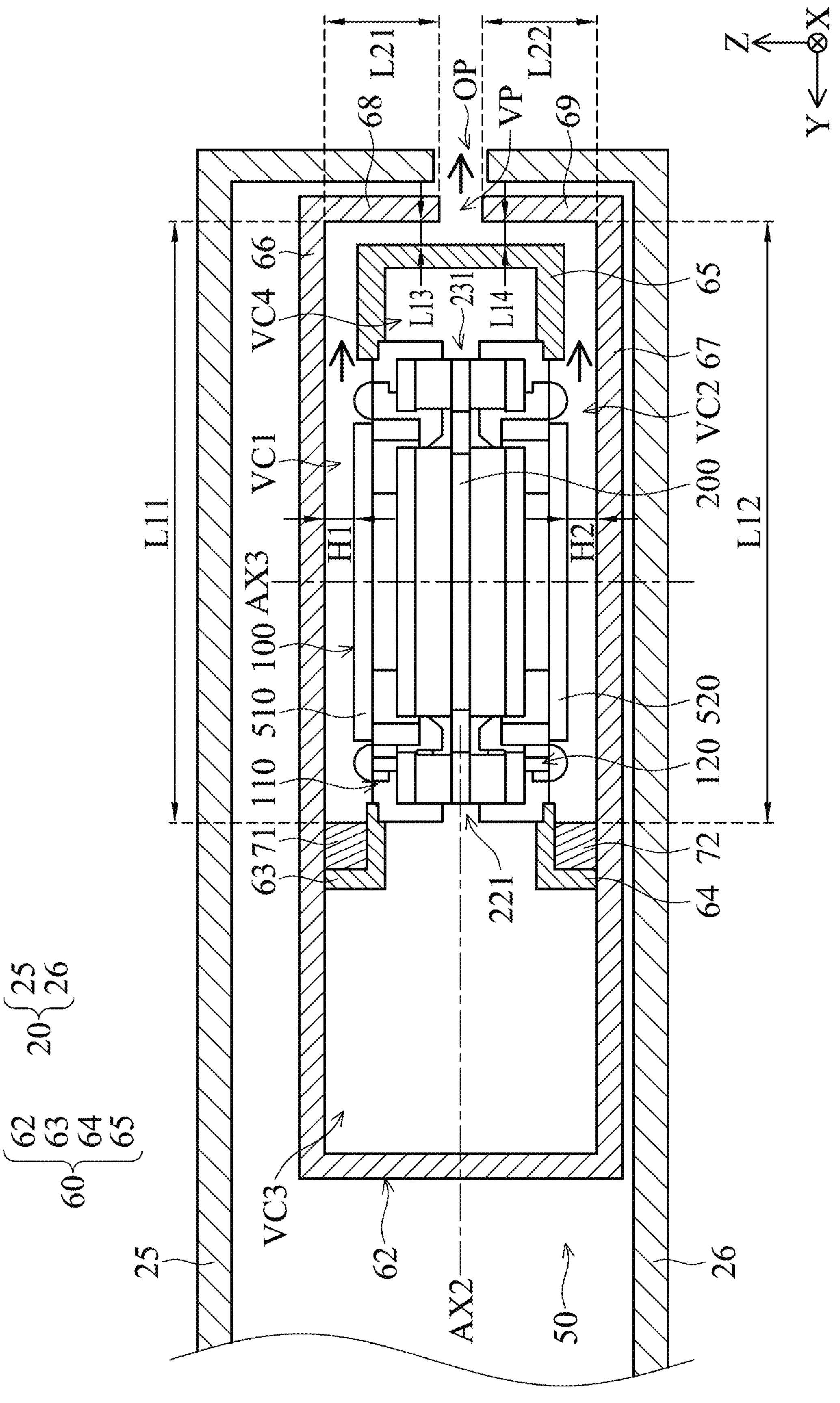
FIG. 10 is a schematic cross-sectional view of the electronic device 10 along line A-A in FIG. 1 according to an embodiment of the present disclosure.

Next, please refer to FIG. 1 and FIG. 10. FIG. 10 is a schematic cross-sectional view of the electronic device 10 along line A-A in FIG. 1 according to an embodiment of the present disclosure. The housing 20 may include an upper part 25 and a lower part 26. The upper part 25 and the lower part 26 are generally referred to as the C part and the D part respectively, and the upper part 25 and the lower part 26 can be affixed to each other to accommodate various electronic components, such as circuit board, a processor (not shown in the figures) or the speaker module 50.

As shown in FIG. 10, the speaker module 50 further includes a casing 60, and the speaker unit 100 is disposed in the casing 60. A sound outlet VP is formed on the casing 60 and is aligned with an opening OP of the housing 20. Specifically, the speaker unit 100, the sound outlet VP, and the opening OP are arranged in order along the second axis AX2 (the transverse axis), and the first speaker assembly 110, the holding base 200, and the second speaker assembly 120 are arranged in order along a longitudinal axis AX3. The longitudinal axis AX3 is, for example, a central axis of the speaker unit 100 parallel to the Z-axis.

A first sound cavity VC1 can be formed between the casing 60 and the first speaker assembly 110, a second sound cavity VC2 can be formed between the casing 60 and the second speaker assembly 120, the first sound cavity VC1 and the second sound cavity VC2 are communicated with the sound outlet VP, and the first sound cavity VC1 and the second sound cavity VC2 have the same size and are symmetrical to the holding base 200. The detailed structures of them are described later.

The casing 60 includes an outer frame 62, a first clamping member 63, a second clamping member 64, and a third clamping member 65, and the first clamping member 63, the second clamping member 64 and the third clamping member 65 are fixed in the outer frame 62. The first clamping member 63 and the second clamping member 64 clamp the first side (such as the left side) of the speaker unit 100, the third clamping member 65 clamps the second side (such as the right side) of the speaker unit 100, and the first side is opposite the second side. The first clamping member 63, the second clamping member 64, and the third clamping member 65 can stably fix the speaker unit 100 in the outer frame 62.

Furthermore, the speaker module 50 further includes a first sound insulation element 71 and a second sound insulation element 72. The first sound insulation element 71 is disposed between the first clamping member 63 and the outer frame 62, and the second sound insulation element 72 is disposed between the second clamping member 64 and the outer frame 62. The first sound insulation element 71 and the second sound insulation element 72 can be made of, for example, sponge, ABS plastic material, or PC plastic material, and so on, but it is not limited thereto.

When viewed along the first axis AX1 (the X-axis, the long axis) of the speaker unit 100, as shown in FIG. 10, the first sound insulation element 71 and the second sound insulation element 72 are symmetrical to the second axis AX2 (the transverse axis), and the first clamping member 63 and the second clamping member 64 are symmetrical to the first axis AX1. Specifically, the first clamping member 63 and the second clamping member 64 have the same shape and size, the first sound insulation element 71 and the second sound insulation element 72 are rectangular bodies, and both of them have the same size and material.

In this embodiment, the outer frame 62 has a first side wall 66, a second side wall 67, a third side wall 68, and a fourth side wall 69. The first side wall 66 is connected to the third side wall 68, the second side wall 67 is connected to the fourth side wall 69, and the sound outlet VP is formed by the third side wall 68 and the fourth side wall 69.

The first side wall 66 and the third side wall 68 of the outer frame 62, the first sound insulation element 71, the first clamping member 63, the first speaker assembly 110 and the third clamping member 65 form a first sound cavity VC1, and the second side wall 67 and the fourth side wall 69 of the outer frame 62, the second sound insulation element 72, the second clamping member 64, the second speaker assembly 120 and the third clamping member 65 form a second sound cavity VC2.

The first sound cavity VC1, the second sound cavity VC2, and the sound outlet VP are communicated with each other, the first sound cavity VC1 and the second sound cavity VC2 are symmetrical to the holding base 200 and the second axis AX2, and the first sound cavity VC1 and the second sound cavity VC2 have the same size (such as the same volume).

Specifically, the distance H1 between the first diaphragm 510 and the first side wall 66 in the longitudinal axis AX3 is equal to the distance H2 between the second diaphragm 520 and the second side wall 67 in the longitudinal axis AX3. The distance L11 between the first sound insulation element 71 and the third side wall 68 in the second axis AX2 is equal to the distance L12 between the second sound insulation element 72 and the fourth side wall 69 in the second axis AX2.

The distance L13 between the third clamping member 65 and the third side wall 68 in the second axis AX2 is equal to the distance L14 between the third clamping member 65 and the fourth side wall 69 in the second axis AX2. The length L21 of the third side wall 68 in the longitudinal axis AX3 is equal to the length L22 of the fourth side wall 69 in the longitudinal axis AX3.

According to the above structural design, the first sound cavity VC1 and the second sound cavity VC2 have an L-shaped structure and the geometric parameters and volumes of them are the same.

Therefore, the path length of the sound traveling from the first diaphragm 510 to the sound outlet VP is the same as the path length of the sound traveling from the second diaphragm 520 to the sound outlet VP, so that when the first diaphragm 510 and the second diaphragm 520 emit sounds at the same time, the pressure in the first sound cavity VC1 is the same as the pressure in the second sound cavity VC2. Therefore, the speaker unit 100 remains stable without any vibration (such as vibration in the Z-axis).

In addition, in this embodiment, the first clamping member 63, the second clamping member 64 and the outer frame 62 form a semi-enclosed third sound cavity VC3, and the third sound cavity VC3 is communicated with a first vent hole (the vent hole 221) of the speaker unit 100. The third clamping member 65 and the speaker unit 100 form a semi-enclosed fourth sound cavity VC4, and the fourth sound cavity VC4 is communicated with a second vent hole (the vent hole 231) of the speaker unit 100.

Because the third sound cavity VC3 and the fourth sound cavity VC4 are not communicated with the first sound cavity VC1 and the second sound cavity VC2, so that the pressure in the first sound cavity VC1 and the second sound cavity VC2 is not affected, and thus the speaker unit 100 remains stable.

In this embodiment, the first clamping member 63, the second clamping member 64, and the third clamping member 65 clamp the speaker unit 100 in an engaging manner, but it is not limited thereto. For example, in other embodiments, the speaker module 50 may further include at least one buffer element (not shown in the figures), which is disposed between the first clamping member 63 and the speaker unit 100, between the second clamping member 64 and the speaker unit 100 and/or between the third clamping member 65 and speaker unit 100. The buffer element may be, for example, elastic glue.

Figure 11:
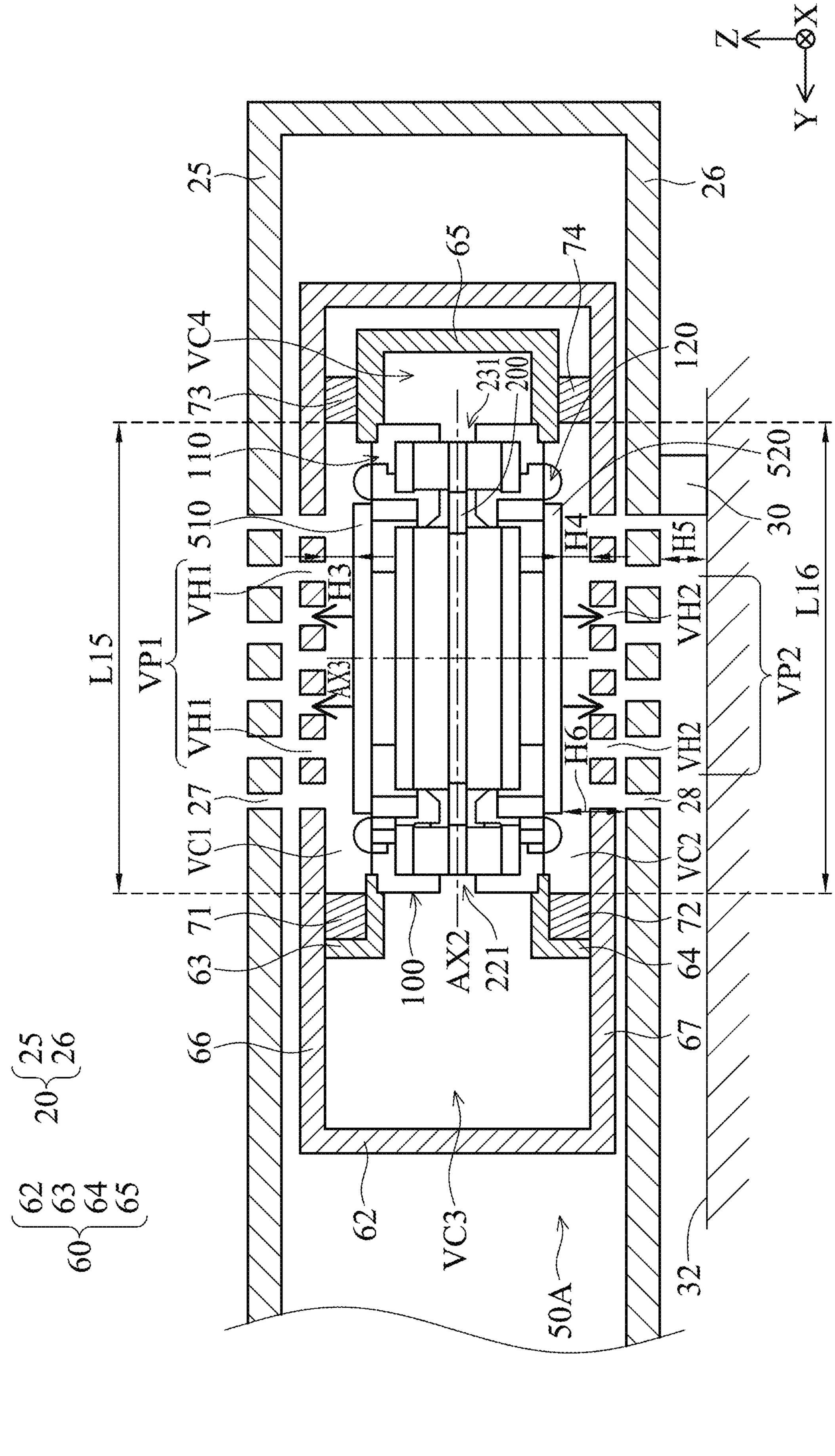
FIG. 11 is a schematic cross-sectional view of the electronic device 10 according to another embodiment of the present disclosure.

Next, please refer to FIG. 11, which is a schematic cross-sectional view of the electronic device 10 according to another embodiment of the present disclosure. In this embodiment, the casing 60 of the speaker module 50A has a first sound exiting portion VP1 and a second sound exiting portion VP2, and the first sound exiting portion VP1, the first speaker assembly 110, the holding base 200, the second speaker assembly 120 and the second sound exiting portion VP2 are arranged in order along the longitudinal axis AX3.

In this embodiment, the first sound cavity VC1 is formed between the casing 60 and the first speaker assembly 110, and the second sound cavity VC2 is formed between the casing 60 and the second speaker assembly 120. The first sound cavity VC1 is communicated with the first sound exiting portion VP1, the second sound cavity VC2 is communicated with the second sound exiting portion VP2, and the first sound cavity VC1 and the second sound cavity VC2 have the same size and are symmetrical to the holding base 200.

The structure of the casing 60 of this embodiment is the same as that in the previous embodiment, and the first clamping member 63, the second clamping member 64 and the third clamping member 65 clamp the speaker unit 100 in the same manner, so they are omitted herein.

In this embodiment, the speaker module 50 includes a first sound insulation element 71, a second sound insulation element 72, a third sound insulation element 73, and a fourth sound insulation element 74. The first sound insulation element 71 is disposed between the first clamping member 63 and the outer frame 62, and the second sound insulation element 72 is disposed between the second clamping member 64 and the outer frame 62. When viewed along the first axis AX1 (the long axis) of the speaker unit 100, the first sound insulation element 71 and the second sound insulation element 72 are symmetrical to the second axis AX2, and the first clamping member 63 and the second clamping member 64 are also symmetrical to the second axis AX2.

Furthermore, in this embodiment, the third sound insulation element 73 and the fourth sound insulation element 74 are disposed between the third clamping member 65 and the outer frame 62. When viewed along the first axis AX1 (the long axis), the third sound insulation element 73 and the fourth sound insulation element 74 are symmetrical to the second axis AX2 (the transverse axis).

As shown in FIG. 11, the outer frame 62, the first sound insulation element 71, the first clamping member 63, the first speaker assembly 110, the third sound insulation element 73, and the third clamping member 65 form a first sound cavity VC1, and the outer frame 62, the second sound insulation element 72, the second clamping member 64, the second speaker assembly 120, the fourth sound insulation element 74 and the third clamping member 65 form a second sound cavity VC2.

It is worth noting that, in some embodiments, the sound insulation element may be integrally formed with the corresponding clamping member. For example, the first sound insulation element 71 and the first clamping member 63 are integrally formed in one piece, the second sound insulation element 72 and the second clamping member 64 are integrally formed in one piece, and the third sound insulation element 73, the fourth sound insulation element 74 and the third clamping member 65 are integrally formed in one piece.

In this embodiment, the outer frame 62 has a first side wall 66 and a second side wall 67, and a first sound exiting portion VP1 and a second sound exiting portion VP2 are formed on the first side wall 66 and the second side wall 67, respectively. As shown in FIG. 11, the first sound cavity VC1 and the first sound exiting portion VP1 are communicated with each other, and the second sound cavity VC2 and the second sound exiting portion VP2 are communicated with each other. The first sound cavity VC1 and the second sound cavity VC2 are symmetrical to the holding base 200 and the second axis AX2, and the first sound cavity VC1 and the second sound cavity VC2 have the same size (for example, the same volume).

Specifically, the distance H3 between the first diaphragm 510 and the first side wall 66 in the longitudinal axis AX3 is equal to the distance H4 between the second diaphragm 520 and the second side wall 67 in the longitudinal axis AX3, and the distance L15 between the first sound insulation element 71 and the third sound insulation element 73 in the second axis AX2 is equal to the distance L16 between the second sound insulation element 72 and the fourth sound insulation element 74 in the second axis AX2.

Based on the above structural design, the first sound cavity VC1 and the second sound cavity VC2 have a rectangular structure, and the geometric parameters and volumes of the them are the same.

It should be noted that in this embodiment, the first sound exiting portion VP1 has a plurality of first sound outlets VH1, the second sound exiting portion VP2 has a plurality of second sound outlets VH2, and these first sound outlets VH1 and these second sound outlets VH2 are completely symmetrical to the second axis AX2. The first sound outlet VH1 and the second sound outlet VH2 may be circular, rectangular or polygonal through holes, but they are not limited thereto.

Based on the above-mentioned structural design, the path length of the sound traveling from the first diaphragm 510 to the first sound exiting portion VP1 is the same as the path length of the sound traveling from the second diaphragm 520 to the second sound exiting portion VP2, so that when the first diaphragm 510 and the second diaphragm 520 emit sounds at the same time, the pressure in the first sound cavity VC1 is the same as the second sound cavity VC2. Therefore, the speaker unit 100 remains stable without any vibration (such as vibration in the Z-axis).

It is worth noting that the total area of the first sound outlets VH1 is at least 50% of the area of the first diaphragm 510, and the total area of the second sound outlets VH2 is at least 50% of the area of the second diaphragm 520. Based on this design, it can be ensured that the high-frequency sound generated by the speaker unit 100 passes through the first sound exiting portion VP1 and the second sound exiting portion VP2.

Furthermore, in this embodiment, a plurality of perforations 27 are formed on the upper part 25, corresponding to the plurality of first sound outlets VH1, and a plurality of perforations 28 are formed on the lower part 26, corresponding to the plurality of second sound outlets VH2. The number and shape of the perforation 27 are the same as the number and shape of the perforation 28. That is, the perforations 27 and the perforations 28 are symmetrical to the second axis AX2. However, the number and shape of the perforation 27 may be different from the number and shape of the first sound outlet VH1, and can be designed depending on actual requirements.

In addition, as shown in FIG. 11, the housing 20 is placed on a desktop 32 by a supporting member 30, so that there is a gap H5 (the first gap) between the lower part 26 and the desktop 32. There is a gap H6 (the second gap) between the second diaphragm 520 and the inner wall surface of the lower part 26, and the gap H5 is at least one third of the gap H6. Based on this design, it can be ensured that the air is successfully discharged from the second sound cavity VC2, so that the pressure in the second sound cavity VC2 is maintained the same as the pressure in the first sound cavity VC1.

Similar to the foregoing embodiment, the speaker module 50A of this embodiment also has a semi-enclosed third sound cavity VC3 and a semi-enclosed fourth sound cavity VC4. The third sound cavity VC3 is only communicated with the first vent hole (the vent hole 221) of the speaker unit 100, and the fourth sound cavity VC4 is only communicated with the second vent hole (the vent hole 231) of the speaker unit 100. The rest of the structural configuration is similar to the foregoing embodiment, so it is not repeated herein.

Similar to the foregoing embodiment, the speaker module 50 may also include at least one buffer element (not shown in the figures), which is disposed between the first clamping member 63 and the speaker unit 100, between the second clamping member 64 and the speaker unit 100, and/or between the third clamping member 65 and speaker unit 100.

In summary, the present disclosure provides a speaker module 50, including a casing 60 and a speaker unit 100. The speaker unit 100 includes a holding base 200 and a pair of speaker assemblies. The first speaker assembly 110 and the second speaker assembly 120 are symmetrical to the holding base 200. The casing 60 and the first speaker assembly 110 form a first sound cavity VC1, and the casing 60 and the second speaker assembly 120 form a second sound cavity VC2. The first sound cavity VC1 and the second sound cavity VC2 have the same size and are symmetrical to the holding base 200, so that when the speaker unit 100 emits sound, the pressure in the first sound cavity VC1 is the same as the pressure in the second sound cavity VC2. Therefore, the speaker unit 100 remains stable without any vibration (such as vibration in the Z-axis).

In addition, because the first speaker assembly 110 and the second speaker assembly 120 are symmetrical to the holding base 200, when the speaker unit 100 receives a current, the first electromagnetic driving force F1 and the second electromagnetic driving force F2 for respectively driving the first diaphragm 510 and the second diaphragm 520 to vibrate have the same magnitude but in opposite directions, so that the holding base 200 is not affected by the above-mentioned electromagnetic driving forces. That is, the holding base 200 is not moved along the Z-axis when the speaker unit 100 emits a sound.

Based on the design of this disclosure, when the speaker module 50 receives a current signal and emits sound, the speaker module 50 has no displacement in the Z-axis. Therefore, the speaker module 50 installed on any electronic device (such as a tablet computer or a smartphone) does not cause vibration noise and affect the sound output of the speaker module 50.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A speaker module, comprising:

a casing, having a sound outlet; and a speaker unit, disposed in the casing, wherein the speaker unit includes:

a holding base;

a first speaker assembly, disposed on the holding base; and a second speaker assembly, disposed on the holding base;

wherein the first speaker assembly, the holding base and the second speaker assembly are arranged in sequence along a longitudinal axis, and the first speaker assembly and the second speaker assembly are symmetrical to the holding base;

wherein a first sound cavity is formed between the casing and the first speaker assembly, a second sound cavity is formed between the casing and the second speaker assembly, the first sound cavity and the second sound cavity are communicated with the sound outlet, and the first sound cavity and the second sound cavity have the same size and are symmetrical to the holding base;

wherein the first sound cavity and the second sound cavity each has an L-shaped structure.

2. The speaker module as claimed in claim 1, wherein the casing includes an outer frame, a first clamping member, a second clamping member and a third clamping member, the first clamping member, the second clamping member and the third clamping member are fixed in the outer frame, the first clamping member and the second clamping member clamp a first side of the speaker unit, the third clamping member clamps a second side of the speaker unit, and the first side is opposite the second side.

3. The speaker module as claimed in claim 2, wherein the speaker unit and the sound outlet are arranged along a transverse axis, and the speaker module further includes:

a first sound insulation element, disposed between the first clamping member and the outer frame; and a second sound insulation element, disposed between the second clamping member and the outer frame;

when viewed along a long axis of the speaker unit, the first sound insulation element and the second sound insulation element are symmetrical to the transverse axis, and the first clamping member and the second clamping member are symmetrical to the transverse axis.

4. The speaker module as claimed in claim 3, wherein the outer frame, the first sound insulation element, the first clamping member, the first speaker assembly and the third clamping member form the first sound cavity, and the outer frame, the second sound insulation element, the second clamping member, the second speaker assembly and the third clamping member form the second sound cavity.

5. The speaker module as claimed in claim 4, wherein the outer frame has a first side wall, a second side wall, a third side wall and a fourth side wall, the first side wall is connected to the third side wall, and the second side wall is connected to the fourth side wall, wherein a distance between a first diaphragm of the first speaker assembly and the first side wall in the longitudinal axis is equal to a distance between a second diaphragm of the second speaker assembly and the second side wall in the longitudinal axis.

6. The speaker module as claimed in claim 5, wherein a distance between the first sound insulation element and the third side wall in the transverse axis is equal to a distance between the second sound insulation element and the fourth side wall in the transverse axis, a distance between the third clamping member and the third side wall in the transverse axis is equal to a distance between the third clamping member and the fourth side wall in the transverse axis, and a length of the third side wall in the longitudinal axis is equal to a length of the fourth side wall in the longitudinal axis.

7. The speaker module as claimed in claim 4, wherein the first clamping member, the second clamping member and the outer frame form a semi-enclosed third sound cavity, the third sound cavity is communicated with a first vent hole of the speaker unit, the third clamping member and the speaker unit form a semi-enclosed fourth sound cavity, and the fourth sound cavity is communicated with a second vent hole of the speaker unit.

8. The speaker module as claimed in claim 2, wherein the speaker module further includes at least one buffer element disposed between the first clamping member and the speaker unit, between the second clamping member and the speaker unit, and/or between the third clamping member and the speaker unit.

9. A speaker module, comprising:

a casing, having a first sound exiting portion and a second sound exiting portion; and a speaker unit, disposed in the casing, and the speaker unit including:

a holding base;

a first speaker assembly, disposed on the holding base; and a second speaker assembly, disposed on the holding base;

wherein the first sound exiting portion, the first speaker assembly, the holding base, the second speaker assembly and the second sound exiting portion are arranged in order along a longitudinal axis, and the first speaker assembly and the second speaker assembly are symmetrical to the holding base;

wherein a first sound cavity is formed between the casing and the first speaker assembly, a second sound cavity is formed between the casing and the second speaker assembly, the first sound cavity is communicated with the first sound exiting portion, the second sound cavity is communicated with the second sound exiting portion, and the first sound cavity and the second sound cavity have the same size and are symmetrical to the holding base;

wherein the casing includes a first clamping member, a second clamping member and a third clamping member, and when viewed in a first axis, the first clamping member, the second clamping member and the third clamping member are not symmetrical to the longitudinal axis, wherein the first axis perpendicular to the longitudinal axis.

10. The speaker module as claimed in claim 9, wherein the casing further includes an outer frame, the first clamping member, the second clamping member and the third clamping member are fixed in the outer frame, the first clamping member and the second clamping member clamp a first side of the speaker unit, the third clamping member clamps a second side of the speaker unit, and the first side is opposite the second side.

11. The speaker module as claimed in claim 10, wherein the speaker module further includes:

a first sound insulation element, disposed between the first clamping member and the outer frame; and a second sound insulation element, disposed between the second clamping member and the outer frame;

when viewed along a long axis of the speaker unit, the first sound insulation element and the second sound insulation element are symmetrical to a transverse axis of the speaker unit, and the first clamping member and the second clamping member are symmetrical to the transverse axis.

12. The speaker module as claimed in claim 11, wherein the speaker module further includes a third sound insulation element and a fourth sound insulation element disposed between the third clamping member and the outer frame;

wherein when viewed along the long axis, the third sound insulation element and the fourth sound insulation element are symmetrical to the transverse axis.

13. The speaker module as claimed in claim 12, wherein the first sound cavity is formed by the outer frame, the first sound insulation element, the first clamping member, the first speaker assembly, the third sound insulation element and the third clamping member, and the second sound cavity is formed by the outer frame, the second sound insulation element, the second clamping member, the second speaker assembly, the fourth sound insulation element and the third clamping member.

14. The speaker module as claimed in claim 12, wherein the outer frame has a first side wall and a second side wall, and the first sound exiting portion and the second sound exiting portion are respectively formed on the first side wall and the second side wall, wherein a distance between a first diaphragm of the first speaker assembly and the first side wall in the longitudinal axis is equal to a distance between a second diaphragm of the second speaker assembly and the second side wall in the longitudinal axis.

15. The speaker module as claimed in claim 14, wherein a distance between the first sound insulation element and the third sound insulation element in the transverse axis is equal to a distance between the second sound insulation element and the fourth sound insulation element in the transverse axis.

16. The speaker module as claimed in claim 14, wherein the first sound exiting portion has a plurality of first sound outlets, the second sound exiting portion has a plurality of second sound outlets, and these first sound outlets and these second sound outlets are symmetrical to the transverse axis.

17. The speaker module as claimed in claim 16, wherein total area of the first sound outlets is at least 50% of area of the first diaphragm.

18. The speaker module as claimed in claim 10, wherein the first clamping member, the second clamping member and the outer frame form a semi-enclosed third sound cavity, the third sound cavity is communicated with a first vent hole of the speaker unit, the third clamping member and the speaker unit form a semi-enclosed fourth sound cavity, and the fourth sound cavity is communicated with a second vent hole of the speaker unit.

19. The speaker module as claimed in claim 10, wherein the speaker module further includes at least one buffer element disposed between the first clamping member and the speaker unit, between the second clamping member and the speaker unit, and/or between the third clamping member and the speaker unit.

20. An electronic device, comprising:

a housing, having a lower part; and a speaker module comprising:

a casing, having a first sound exiting portion and a second sound exiting portion; and a speaker unit, disposed in the casing, and the speaker unit including:

a holding base;

a first speaker assembly, disposed on the holding base; and a second speaker assembly, disposed on the holding base;

wherein the first sound exiting portion, the first speaker assembly, the holding base, the second speaker assembly and the second sound exiting portion are arranged in order along a longitudinal axis, and the first speaker assembly and the second speaker assembly are symmetrical to the holding base;

wherein a first sound cavity is formed between the casing and the first speaker assembly, a second sound cavity is formed between the casing and the second speaker assembly, the first sound cavity is communicated with the first sound exiting portion, the second sound cavity is communicated with the second sound exiting portion, and the first sound cavity and the second sound cavity have the same size and are symmetrical to the holding base;

wherein the electronic device is disposed on a desktop through a supporting member, there is a first gap between the lower part and the desktop, and there is a second gap between a second diaphragm of the second speaker assembly and the lower part, wherein the first gap is at least one third of the second gap;

wherein a space is formed between the lower part and the casing.

* * * * *